United States Patent [19]

Nemoto et al.

[11] Patent Number: 4,577,245
[45] Date of Patent: Mar. 18, 1986

[54] OPERATING LEVER DEVICE OF MAGNETIC RECORDING TAPE TRANSPORT APPARATUS

[75] Inventors: Shigeru Nemoto; Goro Kitajima; Sinichi Saitou; Hazime Osada, all of Tokyo, Japan

[73] Assignee: Olympus Optical Co., Ltd., Tokyo, Japan

[21] Appl. No.: 703,467

[22] Filed: Feb. 21, 1985

Related U.S. Application Data

[63] Continuation of Ser. No. 617,825, Jun. 6, 1984, abandoned, which is a continuation of Ser. No. 382,210, May 26, 1982, abandoned.

[30] Foreign Application Priority Data

May 28, 1981 [JP] Japan .................................. 56-81723

[51] Int. Cl.[4] ............................................. G11B 15/00
[52] U.S. Cl. ......................................... 360/93; 360/71
[58] Field of Search ...................... 360/93, 96.1, 96.3, 360/71, 105–109

[56] References Cited

U.S. PATENT DOCUMENTS 4,408,237 10/1983 Takahashi et al. ............. 360/105 X Primary Examiner—John D. Wolff
Attorney, Agent, or Firm—Frishauf, Holtz, Goodman & Woodward

[57] ABSTRACT

An operating lever device for a magnetic recording tape transport apparatus which uses a tape cassette and which sets a magnetic recording tape transport mode in response to an electrical signal from signal generator, comprises a first base plate, a second base plate parallel to the first base plate with a distance therebetween, a first operating lever disposed between the base plates to be movable along the base plates between a first position to stop the signal from the generator and a second position in which the generator is allowed to generate the signal, a second operating lever disposed between the base plates to be movable along the base plates between first and second positions and parallel to the moving direction of the first operating lever, an auxiliary operating lever disposed between the base plates to be movable along the base plates among first, second, third and fourth positions and perpendicularly to a direction of movement of the first and second operating levers, the auxiliary operating lever in the first position thereof being spaced apart from the first and second operating levers located in the first positions thereof in the direction of movement of the first and second operating levers from the first position to the second position thereof, the auxiliary operating lever in the second position thereof being engaged with the first operating lever located at the second position thereof, the auxiliary operating lever in the third position.

10 Claims, 13 Drawing Figures

4,577,245

OPERATING LEVER DEVICE OF MAGNETIC RECORDING TAPE TRANSPORT APPARATUS

This application is a continuation, of application Ser. No. 617,825, filed June 6, 1984, which in turn is a Continuation of Ser. No. 382,210 filed May 26, 1982, both now abandoned.

BACKGROUND OF THE INVENTION

This invention relates to an operating lever device used in a magnetic recording tape transport apparatus which uses a tape cassette and is able to be set in a magnetic recording tape transport mode in response to an electrical signal generated from a signal generating means, and is able to release selectively the fitting of the tape cassette in the magnetic recording tape transport apparatus.

In conventional operating lever devices of this type, eject mechanism for selectively ejecting tape cassettes from magnetic recording tape transport apparatuses are complex and their manufacturing and assembling processes are cumbersome. In a conventional complex eject mechanism, the outer dimension of the magnetic recording tape transport apparatus cannot be miniaturized.

SUMMARY OF THE INVENTION

Therefore, an object of the present invention is to provide an operating lever device which is used for a magnetic recording tape transport apparatus, which has a simple construction as compared with a conventional operating lever device and which is able to be readily manufactured and assembled, and which is able to provide a compact magnetic recording tape transport device.

The above object of the present invention may be attained by an operating lever device comprising: a first base plate; a second base plate parallel to the first base plate with a distance therebetween; a first operating lever disposed between the first and second base plates to be movable along the first and second base plates between a first position to stop the electrical signal from signal generating means and a second position in which said signal generating means is allowed to generate the electrical signal; a second operating lever disposed between the first and second base plates to be movable along the first and second base plates between first and second positions and parallel to the moving direction of the first operating lever; an auxiliary operating lever disposed between the first and second base plates to be movable along the first and second base plates among first, second, third and fourth positions and perpendicularly to a direction of movement of the first and second operating levers, the auxiliary operating lever in the first position thereof being spaced apart from the first and second operating levers located in the first positions thereof in the direction of movement of the first and second operating levers from the first position to the second position thereof, the auxiliary operating lever in the second position thereof being engaged with the first operating lever located at the second position thereof, the auxiliary operating lever in the third position thereof being released from the first operating lever located in the second position thereof by being spaced apart from the first position farther than from the second position in a direction from the first position to the second position thereof upon movement of the first operating lever to the second position thereof and subsequent movement of the second operating lever to the second position thereof, the auxiliary operating lever in the fourth position thereof being separated from the first position thereof in a direction from the second and third positions to the first position thereof upon movement of the first operating lever to the first position thereof and subsequent movement of the second operating lever to the second position thereof; and ejecting means disposed at least at one of the first and second base plates for ejecting the tape cassette from the magnetic recording tape transport apparatus upon movement of the auxiliary operating lever from the first position to the fourth position thereof.

Now an embodiment of this invention will be described in detail with reference to the accompanying drawings.

DETAILED DESCRIPTION OF THE PREFERRED EMBODIMENT

Figure 1:
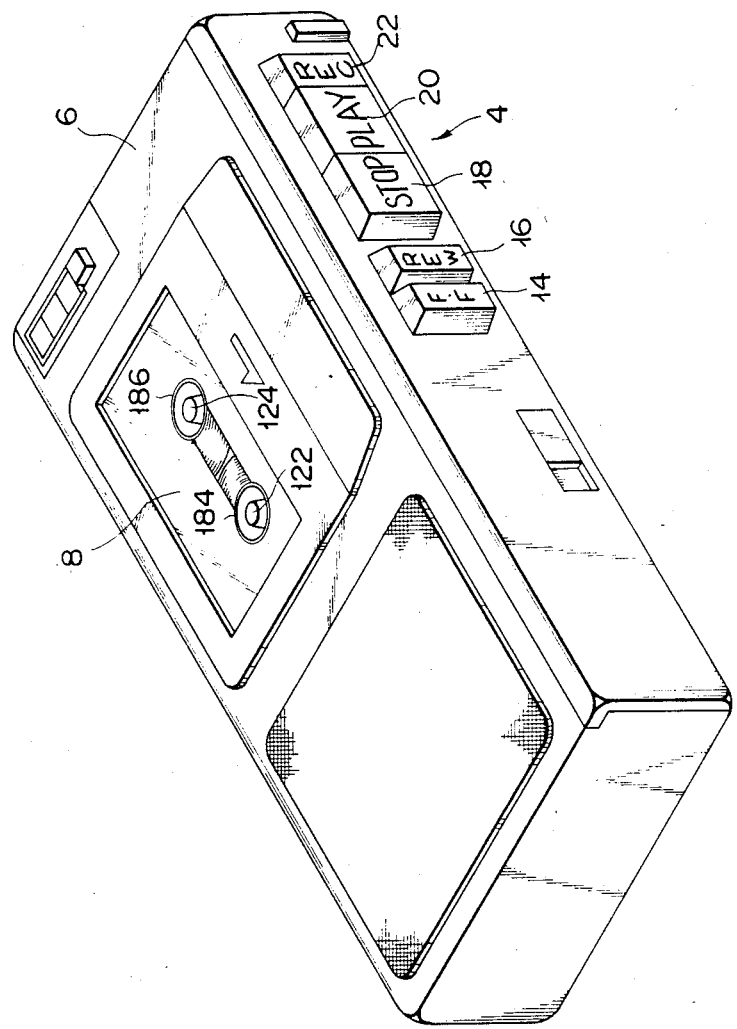
FIG. 1 is a perspective view of a tape recorder which is defined as a magnetic recording tape transport apparatus having an operating lever device according to the embodiment of the present invention.

FIG. 1 shows a magnetic recording tape transport apparatus 6 which is provided with an operating lever device 4 according to an embodiment of this invention. In this embodiment, the magnetic recording tape transport apparatus 6 is a tape recorder using what is called a micro cassette 8, one of the selling points of which lies in compact design or miniaturization.

Figure 2:
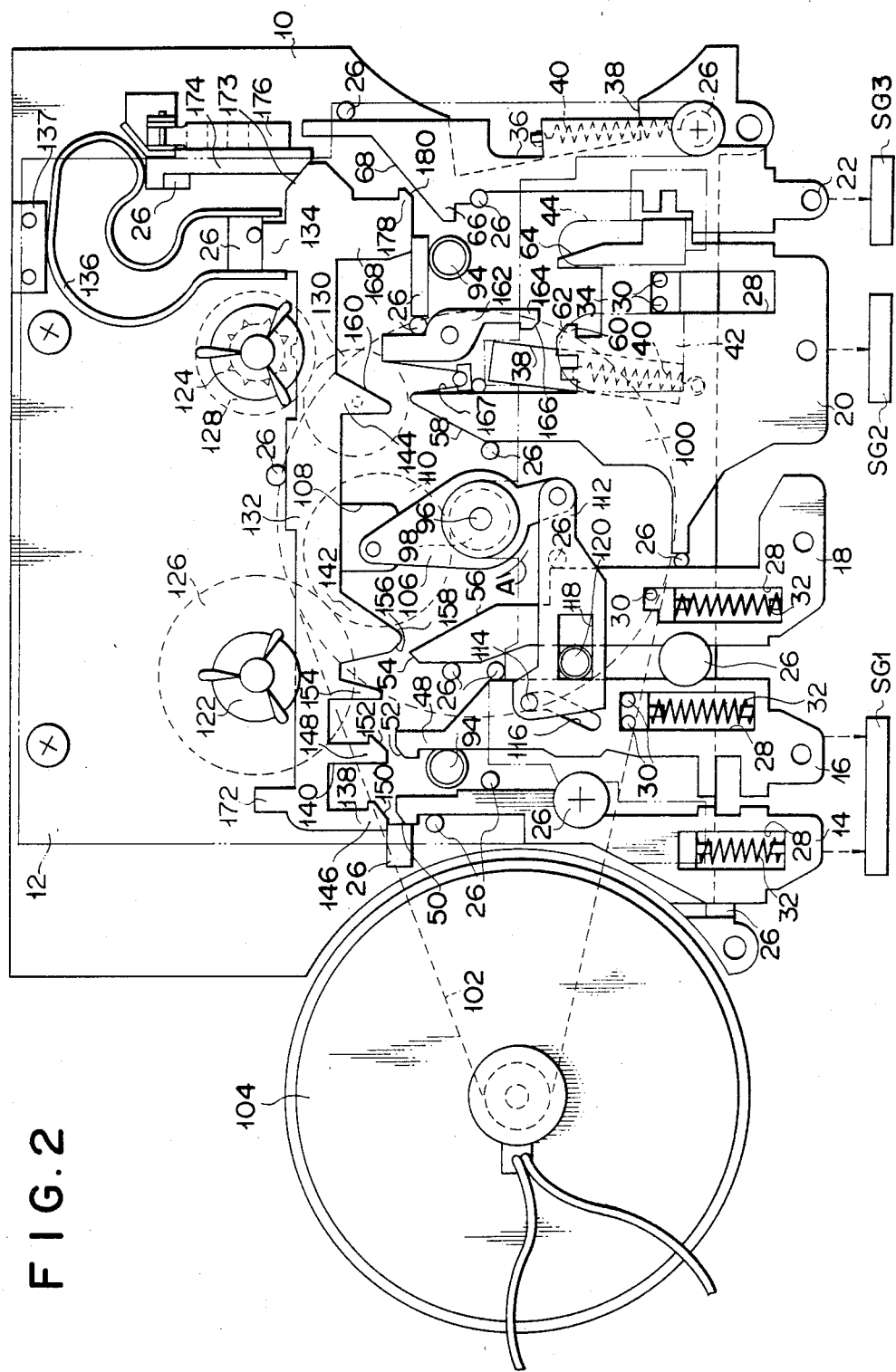
FIG. 2 is a plan view of the operating lever device in which a plurality of operating levers are located at first positions.

The operating lever device 4 is provided with a flat first base plate 10 inside the housing of the magnetic recording tape transport apparatus 6, as shown in FIG. 2.

In front of the first base plate 10, as shown in FIG. 2, a flat second base plate 12 is disposed parallel thereto at a given space therefrom.

Arranged between the first and second base plates 10 and 12 are first to fifth operating levers 14, 16, 18, 20 and 22 formed of flat metal plates.

As shown in FIG. 2, the first to fifth operating levers 14, 16, 18, 20 and 22 are vertically elongated and substantially parallel to one another. The respective lower ends of the first to fifth operating levers 14, 16, 18, 20 and 22 project from the lower edges of the first and second base plates 10 and 12 into the outside space.

A plurality of guide projections 26 are formed on the front surface of the first base plate 10.

As shown in FIG. 2, some of the guide projections 26 are in contact with the vertically extending right and left edges of the first to fifth operating levers 14, 16, 18, 20 and 22. Having their vertical edges in slide contact with the guide projections 26, the first to fifth operating levers 14, 16, 18, 20 and 22 are allowed to move only in the vertical direction. Rightwardly projected portions 45 are formed on the right-hand side faces of the first and fifth operating levers 14 and 22, and the lower end faces of the projected portions are in contact with the guide projections 26 in the state shown in FIG. 2. The positions of the first and fifth operating levers 14 and 22 in this state are defined as their first positions.

As shown in FIG. 2, vertically extending slots 28 are formed in the first to fourth operating levers 14, 16, 18 and 20. Stoppers 30 fixed on the front surface of the first base plate 10 are in contact with the upper end faces of the slots 28 of the second to fourth operating levers 16, 18 and 20. The position of the second to fourth operating levers 16, 18 and 20 in this state are defined as their first positions. Urging means 32 are fitted in the slots 28 of the first to third operating levers 14, 16 and 18. In this embodiment, the urging means 32 is formed of a compression coil spring, the upper end of which abuts on the lower end face of the first base plate 10, and the lower end of which abuts on the lower end face of the slot 28. The diameter of the urging means 32 is only a little greater than the sum of the thicknesses of the first and second base plates 10, 12 and the thickness of each one of the first to third operating levers 14, 16 and 18. Therefore, the urging means 32 projects only slightly from the back surface of the first base plate 10 into the outside space. The urging means 32 urge the first to third operating levers 14, 16 and 18 to be located at their respective first positions. A rightwardly projected support portion 34 is formed on the right-hand side face of the fourth operating lever 20.

A notch 36 is formed on the right-hand side face of the fifth operating lever 22. Two elongate holes 38 are formed in the first base plate 10 so as to cross with the upper end face (viewed in the figure) of the support portion 34 of the fourth operating lever 20 and with a lower end face of the notch 36 of the fifth operating lever 22, respectively. Terms "upper" and "lower" indicate the upper and lower sides of the figure, unless otherwise specified. Urging means 40 are disposed in the elongate holes 38, respectively. In this embodiment, the urging means 40 are constituted by torsion coil springs, respectively. The upper ends of the urging means 40 are respectively hooked at a projection formed at the upper end face of the support portion 34 of the fourth operating lever 20 and a projection formed on the lower end face of the notch 36 of the fifth operating lever 22. The lower ends of the urging means 40 are fixed onto the back surface of the first base plate 10 in the vicinities of the lower ends of the elongate holes 38. Therefore, the urging means 40 urges the fourth and fifth operating levers 20 and 22 toward the first positions thereof.

In front of the support portion 34, a magnetic head 42 is disposed ahead of the front surface of the second base plate 12. The magnetic head 42 is fixed on the support portion 34 by means of a leg (not shown) passed through a hole (not shown) formed in the second base plate 12.

In front of the fifth operating lever 22, a erase head 44 is disposed ahead of the front surface of the second base plate 12. The erase head 44 is fixed on the fifth operating lever 22 by means of a leg (not shown) passed through a hole (not shown) formed in the second base plate 12.

Leftwardly projected first and second engaging portions 46 and 48 are formed at the upper end portions of the first and second operating levers 14 and 16 respectively. The intersectional region between the upper end face and left-hand side face of each one of the first and second engaging portions 46 and 48 is chamfered to form a first or second slant face 50 or 52.

The intersectional regions between the upper end face and the left- and right-hand side faces of the third operating lever 18 are chamfered to form two third slant faces 54 and 56. The intersectional region between the upper end face and left-hand side face of the fourth operating lever 20 is chamfered to form one fourth slant face 58. An indentation is formed in the upper end face of the support portion 34, and the fourth engaging portion 60 projects to the right in the indentation, as shown in FIG. 2. The intersectional region between the upper end face and right-hand side face of the fourth engaging portion 60 is chamfered to form the other fourth slant face 62, as shown in FIG. 2. The intersectional region between the upper end face and right-hand side face of the support portion 34 is chamfered to form a chamfer portion 64.

Formed on the upper end portion of the left-hand side face of the fifth operating lever 22 is a left projected fifth engaging portion 66. A fifth slant face 68 which has a tilt to the right is formed on the upper end faces of the fifth engaging portion 66 and fifth operating lever 22.

Between the upper end portion of the first operating lever 14 and the upper end portion of the second operating lever 16, and between the upper end portion of the fourth operating lever 20 and the upper end portion of the fifth operating lever 22, cassette positioning pins 94 are fixed on the front surface of the first base plate 10, respectively, as shown in FIG. 2. The front ends of the cassette positioning pins 94 penetrate the second base plate 12 to be located ahead thereof.

Between the respective upper end portions of the third and fourth operating levers 18 and 20, a capstan 96 is rotatably mounted on the first base plate 10. The front end of the capstan 96 penetrates the second base plate 12 to be located ahead thereof.

As shown in FIG. 2, a first gear 98 and a flywheel 100 are concentrically fixed to the rear end of the capstan 96 at the back side of the first base plate 10. A driving belt 102 is wound round the peripheral surface of the flywheel 100 and the output shaft of an electric motor 104 which is fixed on the first base plate 10, as shown in FIG. 2.

Between the upper end portion of the third operating lever 18 and the upper end portion of the fourth operating lever 20, a first rotating lever 106 is mounted on the front surface of the first base plate 10 so as to be able to rotate coaxially with the capstan 96. The first rotating lever 106 extends vertically, and can rotate between the first and second base plates 10 and 12.

A backwardly projected shaft is fixed to the back surface of the upper end portion of the first rotating lever 106. This shaft is passed through a hole 108 formed in the first base plate 10. And a second gear 110 is rotatably attached to the rear end of the shaft at the back side of the first base plate 10. The second gear 110 is in mesh with the first gear 98.

In this embodiment, as shown in FIG. 2, the second base plate 12 is notched at the region located below the capstan 96 and facing the second to fifth operating levers 16, 18, 20 and 22. Accordingly, the lower end portion of the first rotating lever 106 is not opposite to the second base plate 12.

The right-hand end portion of a horizontally extending flat coupling member 112 is rotatably mounted on the front surface of the lower end portion of the first rotating lever 106. The left-hand end portion of the coupling member 112 lies on the front surface of the second operating lever 16.

The thickness of the coupling member 112 is equal to that of the second base plate 12. Thus, the coupling member 112 is located within a space between the respective front faces of the first rotating lever 106 and the second operating lever 16, which face the second base plate 12, and the front surface of the second base plate 12, which is to bear the tape cassette 8 set in the tape recorder as the tape recorder 6. Accordingly, the coupling member 112 does not project ahead of the front surface of the second base plate 12.

A backwardly projected guide pin 114 is fixed to the back surface of the left-hand end portion of the coupling member 112. The guide pin 114 is fitted in a guide hole 116 in the second operating lever 16. The guide hole 116 extends straight in the vertical direction and has a tilt to the right. The guide pin 114 of the coupling member 112 is positioned at the upper end of the guide hole 116.

A horizontally extending slot 118 is formed in the coupling member 112. Passed through the left-hand end portion of the slot 118 is a shaft 120 which protrudes forwardly from the first base plate 10 between the right-hand side face of the second operating lever 16 and the left-hand side face of the third operating lever 18. The outer peripheral surface of the shaft 120 is in contact with the horizontally extending upper and lower end face portions of the inner peripheral surface of the slot 118 of the coupling member 112.

Over the upper end faces of the third and fourth operating levers 16 and 20, first and second reel shafts 122 and 124 are rotatably mounted on the first base plate 10. The front ends of the first and second reel shafts 122 and 124 penetrate the second base plate 12 to be located ahead of the front surface of the second base plate 12. Third and fourth gears 126 and 128 are concentrically fixed to the rear ends of the first and second reel shafts 122 and 124 at the back of the first base plate 10. The third gear 126 is in mesh with the second gear 110. The position of the first rotating lever 106 in this state is defined as its first position. A fifth gear 130 is rotatably attached to the back surface of the first base plate 10. The fifth gear 130 is located within the locus of movement of the second gear 110 described as the first rotating lever 106 rotates clockwise from its first position as shown in FIG. 2, and is in mesh with the fourth gear 128.

Between the first and second base plates 10 and 12, as shown in FIG. 2, a flat auxiliary operating lever 132 lies over the respective upper end faces of the first to fifth operating levers 14, 16, 18, 20 and 22. The auxiliary operating lever 132 has an elongate shape extending horizontally.

As shown in FIG. 2, some of the guide projections 26 are in contact with the horizontally extending upper and lower end faces of the auxiliary operating lever 132. Having its upper and lower end faces in slide contact with the guide projections 26, the auxiliary operating lever 132 is allowed to move only in the horizontal direction.

As shown in FIG. 2, an upwardly projected portion 134 is formed on the upper end face of the auxiliary operating lever 132.

The vertically extending left- and right-hand side faces of the upwardly projected portion 134, as shown in FIG. 2, are subjected to opposite urging forces applied by an urging means 136 which is disposed between the first and second base plates 10 and 12. The auxiliary operating lever 132 ceases to move horizontally at the position where the two urging forces of the urging means 136 are balanced with each other. This position of the auxiliary operating lever 132 is defined as its first position. In this embodiment, the urging means 136 is formed of a bent, U-shaped leaf spring, having a pair of leg portions severally in contact with the left- and right-hand side faces of the upwardly projected portion 134 of the auxiliary operating lever 132. In this embodiment, the upper end of the U-shaped leaf spring is bent to the right, as shown in FIG. 2. The upper end face of the bending portion abuts against a stopper 137 fixed on the front surface of the first base plate 10. The dimension of the leaf spring along the thickness of the operating lever device 4 can be made smaller than that of a coil spring.

As shown in FIG. 2, downwardly projected first to fourth hanging portions 138, 140, 142 and 144 are formed at the portions of the auxiliary operating lever 132 facing the upper end faces of the first to fourth operating levers 14, 16, 18 and 20. A rightwardly projected first and second engaged portions 146 and 148 are formed at the lower end portions of the first and second hanging portions 138 and 140. The intersectional region between the lower end face and right-hand side face of each one of the first and second engaged portions 146 and 148, as shown in FIG. 2, is chamfered to form a first or second auxiliary slant face 150 or 152. The first and second auxiliary slant faces 150 and 152 vertically face the first and second slant faces 50 and 52 of the first and second operating levers 14 and 16, respectively.

Between the second hanging portion 140 and the third hanging portion 142, a downwardly projected stopper 154 is formed on the lower end face of the auxiliary operating lever 132.

The distance between the left-hand side face of the second hanging portion 140 and the right-hand side face of the first engaged portion 146 of the first hanging portion 138 is greater than the distance between the right-hand side face of the upper end portion of the first operating lever 14 and the left-hand side face of the first engaging portion 46. The distance between the left-hand side face of the stopper 154 and the right-hand side face of the second engaged portion 148 of the second hanging portion 140 is greater than the distance between the right-hand side face of the upper end portion of the second operating lever 16 and the left-hand side face of the second engaging portion 48.

The intersectional region between the left-hand side face and lower end face of the third hanging portion 142 is chamfered to form one third auxiliary slant face 156. The one third auxiliary slant face 156 vertically faces the other third slant face 56 of the third operating lever 18.

As shown in FIG. 2, the right-hand side face of the third hanging portion 142 has a tilt to the upper right to form a third auxiliary slant face 158.

As shown in FIG. 2, the right-hand side face of the fourth hanging portion 144 has a tilt to the upper right to form a fourth auxiliary slant face 160.

A vertically extending second rotating lever 162 lies between the upper end portion of the fourth operating lever 20 and the upper end portion of the fifth operating lever 22, as well as between the first and second base plates 10 and 12. The second rotating lever 162 is pivotally mounted substantially at the middle on the front surface of the first base plate 10, and can rotate along the front surface of the first base plate 10. A leftwardly extending fourth engaging portion 164 is formed at the lower end portion of the left-hand side face of the second rotating lever 162. The intersectional region between the left-hand side face and lower end face of the fourth engaging portion 164 is chamfered to form a slide contact surface 166, which vertically faces the other fourth slant face 62 of the fourth operating lever 20. One of the guide projections 26 is in contact with the right-hand side face of the upper end portion of the second rotating lever 162 so that the second rotating lever 162 is allowed to rotate only in the counterclockwise direction from its first position as shown in FIG. 2. The position of the second rotating lever 162 in this state is defined as its first position.

The second rotating lever 162 is urged to be located in the first position by an urging means 167 which is disposed between the first and second base plates 10 and 12.

Between the respective upper end portions of the second rotating lever 162 and the fifth operating lever 22, a downwardly projected first hook member 168 is formed on the lower end face of the auxiliary operating lever 132. As shown in FIG. 2, the left-hand side face of the first hook member 168 faces the right-hand side face of the upper end portion of the second rotating lever 162 with a given horizontal space between them.

An upwardly projected second hook member 172 is formed on the left-hand end portion of the upper end face of the auxiliary operating lever 132.

The intersecting portion between the right end of the upper end face of the auxiliary operating lever 132 and the right-hand side face thereof is chamfered to form a slant face 173.

A flat drive member 174 is disposed between the slant face 173 and the lower end face of the bending portion of the urging means 136. The flat drive member 174 extends vertically. The upper end face of the flat drive member 174 is in contact with the lower end face of the bending portion of the urging means 136, while the lower end face thereof is in contact with the slant face 173 of the auxiliary operating lever 132. The guide projection 26 is in contact with the left-hand side face of the flat drive member 174. The flat drive member 174 is allowed only to move vertically by sliding the left-hand side face thereof along the guide projection 26.

Figure 3:
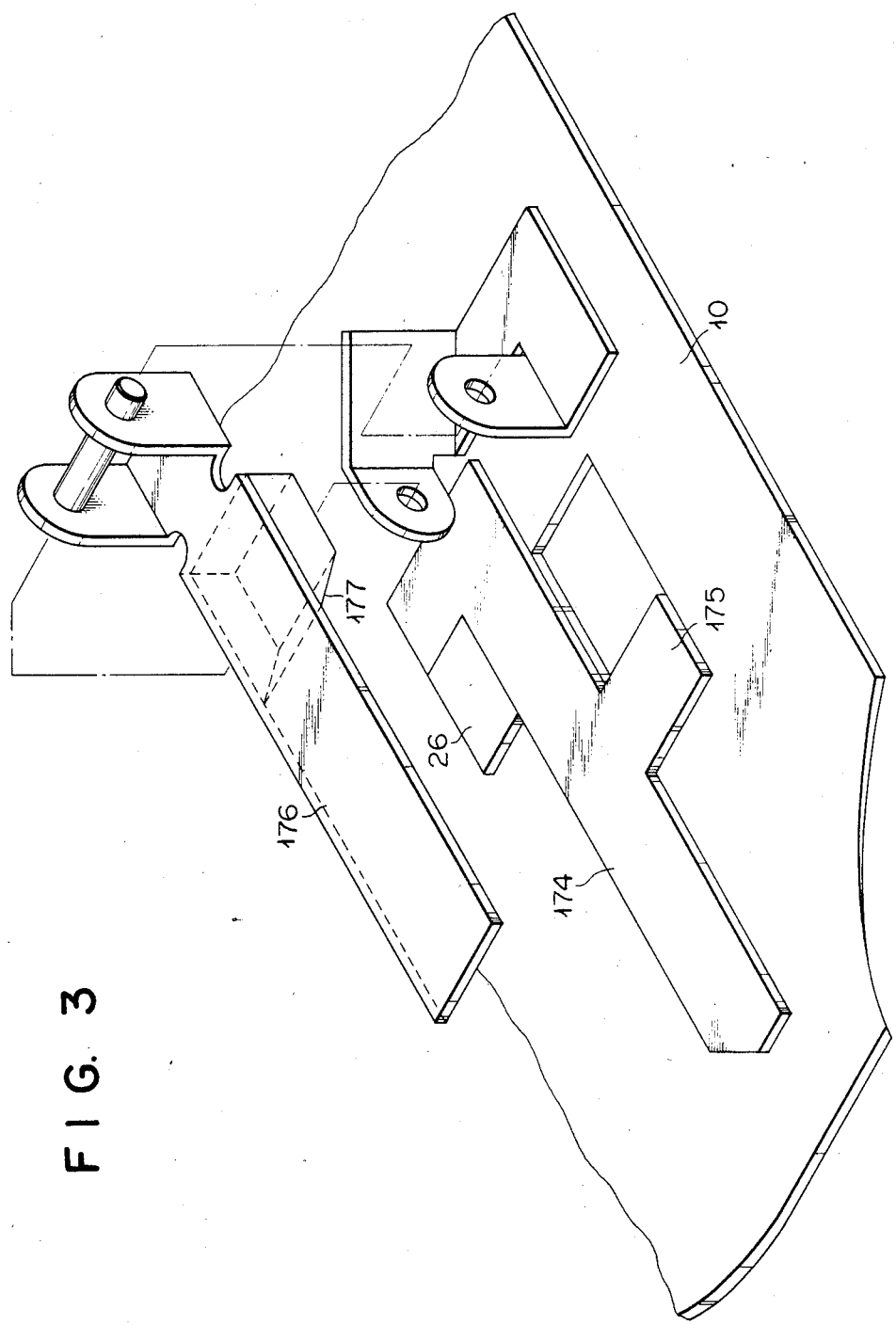
FIG. 3 is an enlarged perspective view of a flat drive member and an eject lever both of which constitute an ejecting means.

The flat drive member 174 has a projection 175 extending to the right from the right-hand side face thereof, as shown in detail in FIG. 3. The upper end face of the projection 175 is in contact with a slant face 177 of a projection depending from an eject lever 176. The eject lever 176 is disposed on the front surface of the first base plate 10 so as to be pivotal perpendicularly thereto, as shown in FIG. 3.

A fifth engaged portion 178 extending to the right is formed on the lower end of the right-hand side face of the first hook member 168 of the auxiliary operating lever 132. The intersecting portion between the right-hand side face of the fifth engaged portion 178 and the lower end face thereof is chamfered to form a fifth auxiliary slant face 180. The fifth auxiliary slant face 180 vertically faces the fifth slant face 68.

The first and second operating levers 14 and 16 are coupled with a first signal generator SG1. When one of the first and second operating levers 14 and 16 stops upward movement from its first position against the urging force of the urging means 32, the first signal generator SG1 produces a first electric signal to rotate the output shaft of the motor 104 in one direction at relatively high speed, thereby rotating the capstan 96 and the first gear 98 in the direction indicated by arrow A in FIG. 2 at relatively high speed.

The fourth operating lever 20 is coupled with a second signal generator SG2. When the fourth operating lever 20 stop upward movement from its first position against the urging force of the urging means 40, the second signal generator SG2 produces a second electric signal to rotate the output shaft of the motor 104 in one direction at relatively low speed, thereby rotating the capstan 96 and the first gear 98 in the direction indicated by arrow A in FIG. 2 at relatively low speed. At the same time, the second signal generator SG2 causes the magnetic head 42 to function as a reproducing head.

The fifth operating lever 22 is coupled with a third signal generator SG3. When the fifth operating lever 22 stops upward movement from its first position against the urging force of the urging means 40, the third signal generator SG3 causes the magnetic head 42 to function as a recording head.

In this embodiment, the first to third signal generators SG1, SG2 and SG3 are of conventional arrangements.

In this embodiment, each one of the first and second operating levers 14 and 16 constitutes first operating lever means as described in the claims.

And, in this embodiment, the third operating lever 18 constitutes second operating lever means as described in the claims.

Furthermore, in this embodiment, the drive member 174 and the eject lever 176 constitute ejecting means as described in the claims.

There will now be described the operation of the operating lever device 4 according to the one embodiment of this invention which is constructed in the above-mentioned manner. The second base plate 12 is shown in FIG. 2 but not shown in FIGS. 3 to 13 for avoiding the complication of drawing.

Figure 4:
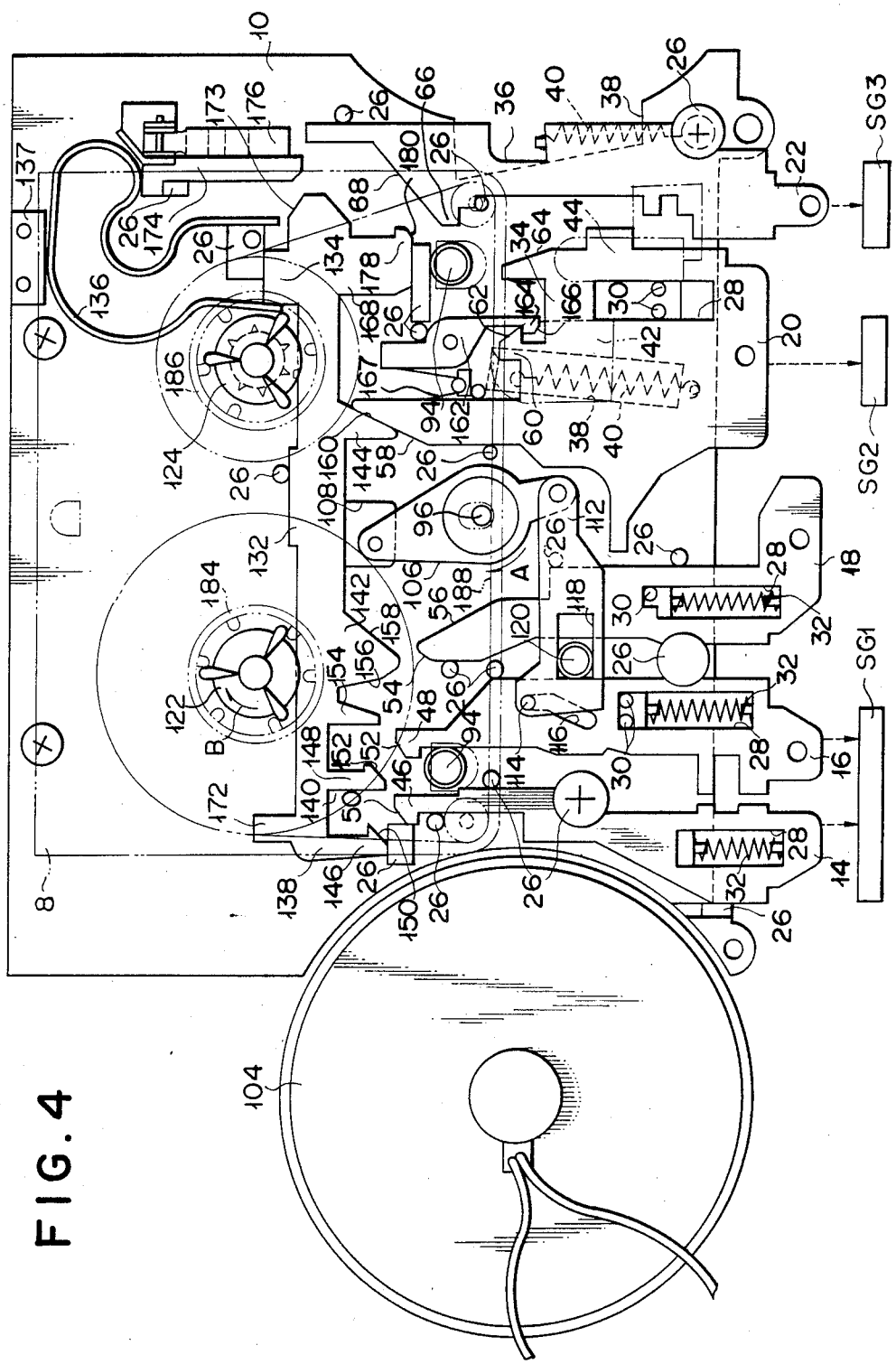
FIG. 4 is a plan view showing a pair of reel hubs of a tape cassette which are fitted on a pair of reel shafts of the tape recorder in FIG. 2, wherein a fourth operating lever corresponding to a first operating lever as defined in the claims and functioning as a playback lever is located in a second position thereof.

As shown in FIG. 4, the first and second reel shafts 122 and 124 are fitted with first and second reel hubs 184 and 186, respectively, of the tape cassette 8. In this state, the capstan 96 is in contact with the back surface of a magnetic recording tape 188 between the first and second reel hubs 184 and 186.

When the fourth operating lever 20 is pressed upward, it moves up from its first position against the urging force of the urging means 40. The one fourth slant face 58 of the upwardly moving fourth operating lever 20 comes into slide contact with the fourth auxiliary slant face 160 of the auxiliary operating lever 132, causing the auxiliary operating lever 132 to move from its first position to the left against the urging force of the urging means 136. Also, the other fourth slant face 62 of the fourth engaging portion 60 of the upwardly moving fourth operating lever 20 comes into slide contact with the other slide contact surface 166 of the second rotating lever 162, causing the second rotating lever 162 to rotate counterclockwise from its first position against the urging force of the urging means 167. When the fourth engaging portion 60 engages the fourth engaged portion 164 of the second rotating lever 162, as shown in FIG. 4, the fourth operating lever 20 stops moving upwardly. The position of the fourth operating lever 20 in this state is defined as its second position.

The horizontal position of the auxiliary operating lever 132 when the fourth operating lever 20 is located in its second position shown in FIG. 4 is defined as a second position of the auxiliary operating lever 132. When the fourth operating lever 20 is located in its second position, the second signal generator SG2 causes the motor 104 to rotate the capstan 96 in the clockwise direction as indicated by arrow A in FIG. 4 at fixed relatively low speed. The rotation of the capstan 96 is transmitted through the first to third gears 98, 110 and 126 to the first reel shaft 122, which then rotates in the direction indicated by arrow B. Moreover, when the fourth operating lever 20 is located in its second position, a pinch roller (not shown) is brought into contact with the front surface of the magnetic recording tape 188. This pinch roller holds the tape 188 in conjunction with the capstan 96. Thus, the tape 188 is wound around the first reel hub 184 after it is drawn out from the side of the second reel hub 186 by the capstan 96 and the pinch roller.

Furthermore, when the fourth operating lever 20 is located in its second position, the magnetic head 42 comes into contact with the front surface of the magnetic recording tape 188, as shown in FIG. 4.

Moreover, when the fourth operating lever 20 is located in its second position, the second signal generator SG2 causes the magnetic head 42 to function as the reproducing head. In this state, therefore, information previously recorded on the magnetic recording tape 188 is reproduced by the magnetic head 42 as the tape 188 runs from the second reel hub 186 to the first reel hub 184 at the fixed speed. Thus, a playback mode is established in the tape recorder 6 which is provided with the operating lever device 4 according to this embodiment. This means that the fourth operating lever 20 serves as a reproducing or playback lever in the tape recorder 6.

When the auxiliary operating lever 132 is located in its second position, the loci of the upward movement of the right-hand side face of the upper end portion of the first operating lever 14 and the left-hand side face of the first engaging portion 46 are located between the right-hand side face of the first engaged portion 146 of the first hanging portion 138 of the auxiliary operating lever 132 and the left-hand side face of the second hanging portion 140, as shown in FIG. 4. Further, the loci of the upward movement of the right-hand side face of the upper end portion of the second operating lever 16 and the left-hand side face of the second engaging portion 48 are located between the right-hand side face of the second engaged portion 148 of the second hanging portion 140 of the auxiliary operating lever 132 and the left-hand side face of the stopper 154, as shown in FIG. 4. Therefore, when the fourth operating lever 20 is located in its second position, the first or second operating lever 14 or 16 can be moved upward from its first position against the urging force of the urging means 32.

When the first operating lever 14 is moved upward from its first position against the urging force of the urging means 32 to locate the first engaging portion 42 of the first operating lever 14 above the first engaged portion 146 of the first hanging portion 138 of the auxiliary operating lever 132, the first electric signal produced from the first signal generator SG1 causes the output shaft of the motor 104 to rotate in one direction at relatively high speed, thereby rotating the capstan 96 and the first gear 98 in the direction indicated by arrow A in FIG. 3 at relatively high speed. The position of the first operating lever 14 in this state is defined as its second position. When the first operating lever 14 is moved upward from its first position against the urging force of the urging means 32, the pinch roller is separated from the magnetic recording tape 188 in the tape cassette 8. At such time, the tape 188 is released from the joint hold by the pinch roller and the capstan 96.

The relatively fast rotation of the first gear 98 in the direction indicated by arrow A is transmitted through the second gear 110 to the third gear 126. Then, the third gear 126 rotates in the direction indicated by arrow B in FIG. 4 at relatively high speed, so that the magnetic recording tape 188 in the tape cassette 8 is quickly fed from the second reel hub 186 to the first reel hub 184. Thus, a fast-forward mode is established in the tape recorder 6 which is provided with the operating lever device 4 according to this embodiment. This means that the first operating lever 14 serves as a fast-forward lever in the tape recorder 6.

While the magnetic recording tape 188 is quickly fed from the second reel hub 186 to the first reel hub 184 in the aforesaid manner, the magnetic head 42 functioning as the reproducing head is in contact with the tape 188, as shown in FIG. 4. It is therefore possible to set up playback mode in the state that the magnetic recording tape 188 travels at relatively high speed. If the upward pressing force on the first operating lever 14 is removed, then the first operating lever 14 is moved downward by the urging force of the urging means 32 to be located in its first position.

Figure 5:
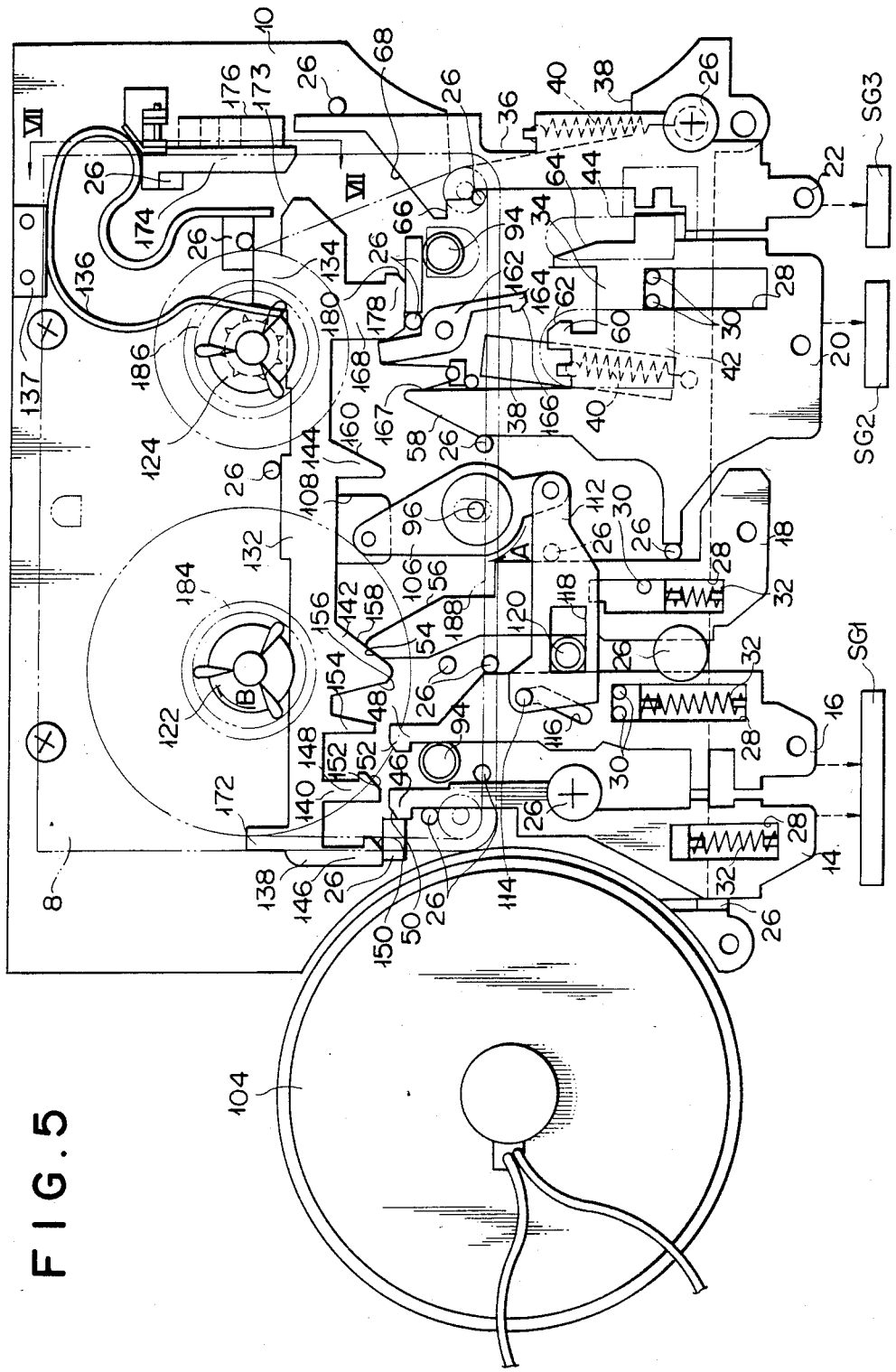
FIG. 5 is a plan view showing the pair of reel hubs of the tape cassette which are fitted on the pair of reel shafts of the tape recorder in FIG. 2, wherein a third operating lever corresponding to a second operating lever as defined in the claims and functioning as a stop lever is located in a second position thereof.

When the auxiliary operating lever 132 is in its second position, the other third auxiliary slant face 158 of the third hanging portion 142 vertically faces the one third slant face 54 of the third operating lever 18. Therefore, if the third operating lever 18 is moved upward from its first position against the urging force of the urging means 32, the one third slant face 54 of the third operating lever 18 comes into slide contact with the third auxiliary slant face 158 of the third hanging portion 142, thereby causing the auxiliary operating lever 132 to move from its second position to the left against the urging force of the urging means 136, as shown in FIG. 5. Then, the left-hand side face of the first hook member 168 of the auxiliary operating lever 132 abuts on the right-hand side face of the upper end portion of the second rotating lever 162, as shown in FIG. 5, to cause the second rotating lever 162 to rotate counterclockwise against the urging force of the urging means 167. Thereupon, the third operating lever 18 stops moving upwardly. The position of the third operating lever 18 in this state is defined as its second position. Also, the position of the auxiliary operating lever 132 in this state is defined as its third position.

When the second rotating lever 162 rotates counterclockwise, the fourth engaged projection 164 of the second rotating lever 162 is disengaged from the fourth engaging portion 60 of the fourth operating lever 20, as shown in FIG. 5. Then, the fourth operating lever 20 is moved downward by the urging force of the urging means 40 to be located in its first position.

When the fourth operating lever 20 is located in its first position, the second signal generator SG2 ceases to produce the second electric signal, thus stopping the rotation of the output shaft of the motor 104 and disabling the magnetic head 42, which is off the magnetic recording tape 188 in the tape cassette 8, as shown in FIG. 5, from functioning as the reproducing head. Thus, a stop mode is established in the tape recorder 6 which is provided with the operating lever device 4 according to this embodiment. This means that the third operating lever 18 serves as a stop lever in the tape recorder 6.

If the upward force having been so far applied to the third operating lever 18 against the urging force of the urging means 32 is removed, the third operating lever 18 is moved downward by the urging force of the urging means 32 to be located in its first position. As the third operating lever 18 moves from its second position to the first position, the auxiliary operating lever 132 is moved to the right by the urging force of the urging means 136 and is returned to its first position.

Figure 6:
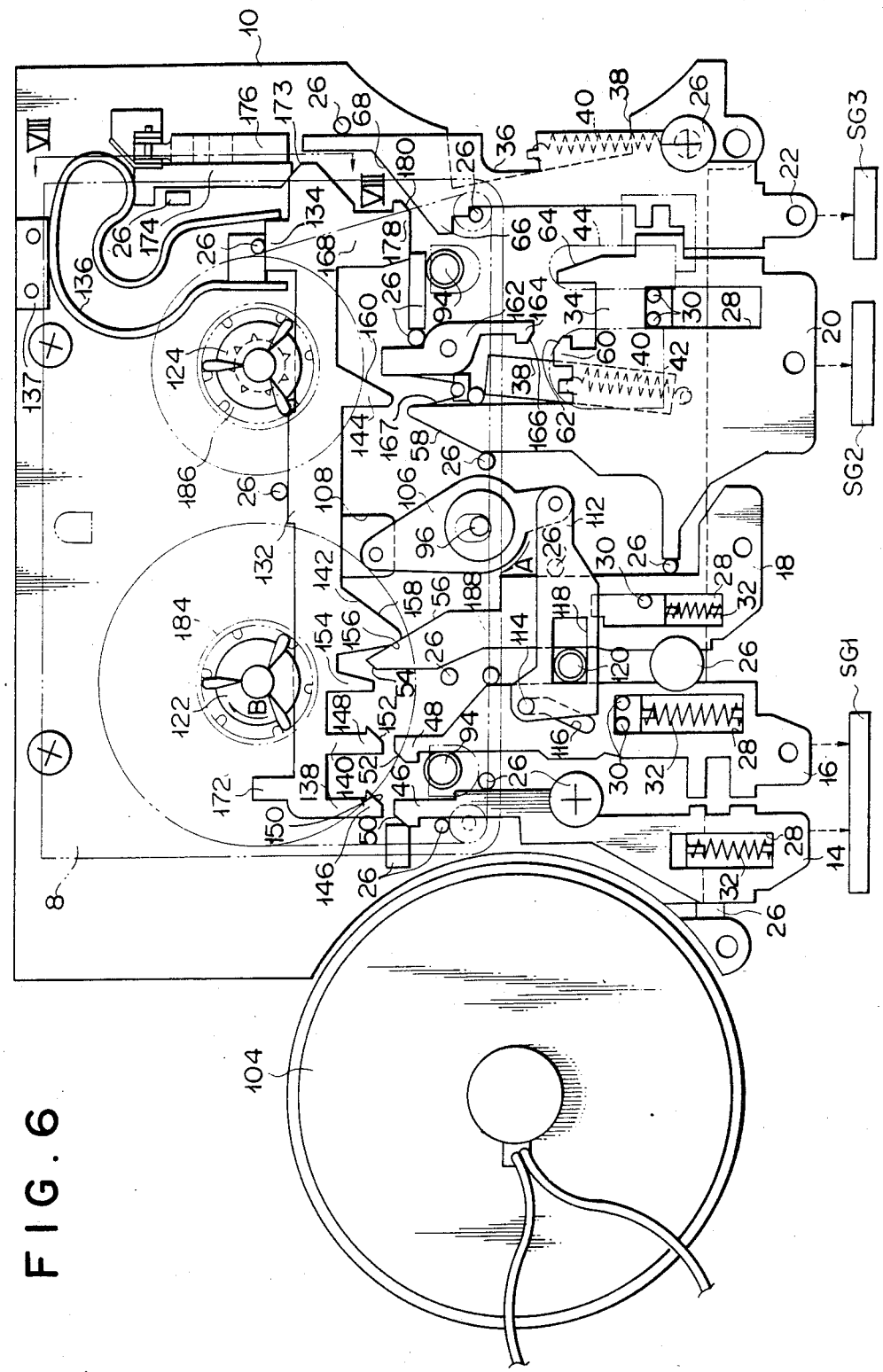
FIG. 6 is a plan view showing the pair of reel hubs of the tape cassette which are fitted on the pair of reel shafts of the tape recorder in FIG. 2, wherein a third operating lever is located at a second position thereof to function as the eject lever.
Figure 7:
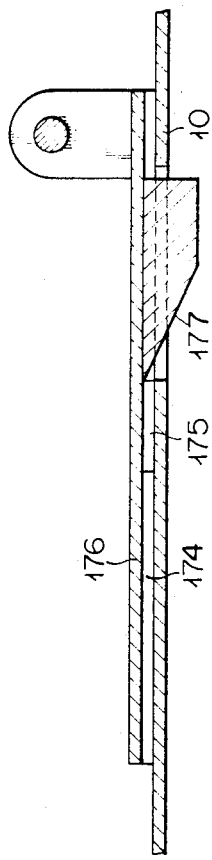
FIG. 7 is a sectional view taken along a line VII—VII in FIG. 5.
Figure 8:
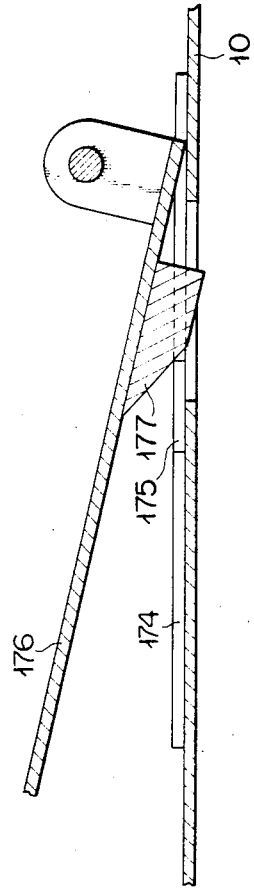
FIG. 8 is a sectional view taken along a line VIII—VIII in FIG. 6.

If the third operating lever 18 is pushed up again when the auxiliary operating lever 132 is located in its first position, the other third slant face 56 of the third operating lever 18 comes into slide contact with the other third auxiliary slant face 156 of the third hanging portion 142 of the auxiliary operating lever 132, thereby causing the auxiliary operating lever 132 to move to the right from its first position against the urging force of the urging means 136, as shown in FIG. 6. The slant face 173 of the auxiliary operating lever 132 is brought into slidable contact with the flat drive member 174. The flat drive member 174 is then moved upward against the urging force of the urging means 136. The projection 175 of the flat drive member 174 comes in slidable contact with the slant face 177 of the projection of the eject lever 176 from the position shown in FIG. 7. The eject lever 176 is then pivoted to intersect or become inclined relative to the first base plate 10, as shown in FIG. 8. The eject lever 176 causes a member (not shown) which faces the bottom surface of the housing of the tape cassette 8 to move to the front side in FIG. 6, thereby moving the tape cassette 8 in the same direction. At this time, first and second reel hubs 184 and 186 of the tape cassette 8 which are fitted on the first and second reel shafts 122 and 124 of the tape recorder 6 are released therefrom. When the force acting on the third operating lever 18 is removed, the third operating lever 18 returns to the first position thereof by the urging force of the urging means 32.

Suppose that the fourth operating lever 20 is located in its second position, as shown in FIG. 4. In this state, the fifth auxiliary slant face 180 of the auxiliary operating lever 132 in its second position vertically faces the fifth slant face 68 of the fifth operating lever 22, as shown in FIG. 4. Moreover, if the fifth operating lever 22 is pressed upward, it moves up from its first position against the urging force of the urging means 40. At this time, the fifth slant face 68 of the fifth operating lever 22 is brought into slide contact with the fifth auxiliary slant face 180 of the auxiliary operating lever 132. Thereupon, the auxiliary operating lever 132 moves from its second position shown in FIG. 4 to the left against the urging force of the urging means 136. Before the auxiliary operating lever 132 is located in its third position shown in FIG. 5, the fifth engaged portion 178 of the auxiliary operating lever 132 and the fifth engaging portion 66 of the fifth operating lever 22 engage each other. Then, the fifth operating lever 22 stops its upward movement. The position of the fifth operating lever 22 in this state is defined as its second position. Further, the position of the auxiliary operating lever 132 in this state is defined as its fourth position (FIG. 9).

Figure 9:
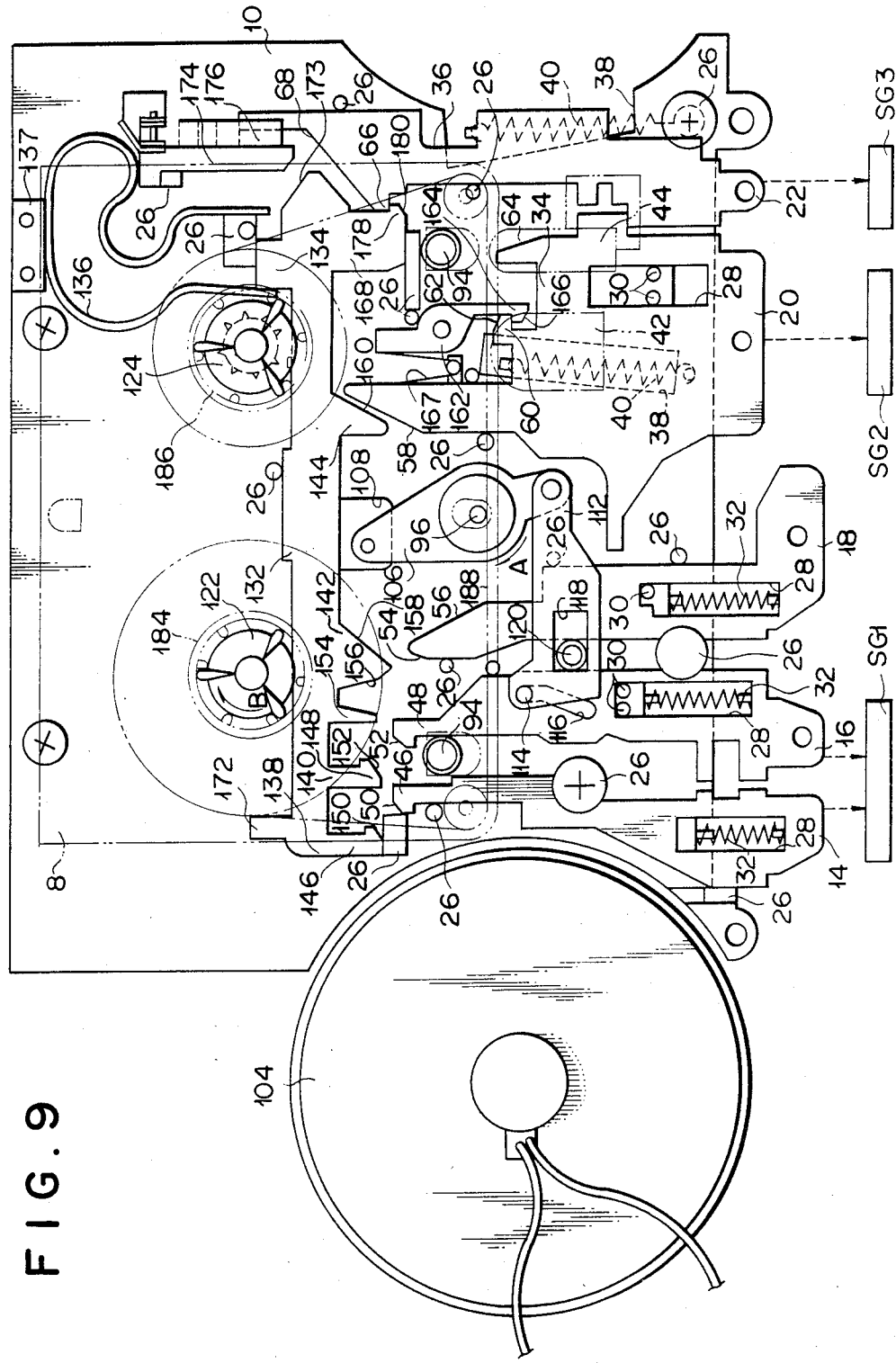
FIG. 9 is a plan view showing the pair of reel hubs of the tape cassette which are fitted on the pair of reel shafts of the tape recorder in FIG. 2, wherein a third operating lever which functions as a playback lever and corresponds to the first operating lever as defined in the claims, and a fifth operating lever which functions as a recording lever, are located in the second positions thereof.

When the fifth operating lever 22 is located in its second position, the erasing head 44 comes into contact with the surface of the magnetic recording tape 188, as shown in FIG. 9.

At that time, the third signal generator SG3 causes the magnetic head 42 to function as the recording head. In this state, therefore, information collected by means of a microphone (not shown) attached to the tape recorder 6 is recorded on the magnetic recording tape 188 by the magnetic head 42 as the tape 188 runs from the second reel hub 186 to the first reel hub 184 at the fixed speed. Thus, a recording mode is established in the tape recorder 6 which is provided with the operating lever device 4 according to this embodiment. This means that the fifth operating lever 22 serves as a recording lever in the tape recorder 6.

When the auxiliary operating lever 132 is in its fourth position, the upper end face of the first operating lever 14 vertically faces the lower end face of the second hanging portion 140 of the auxiliary operating lever 132, as shown in FIG. 9. At the same time, the upper end face of the second operating lever 16 vertically faces the lower end face of the stopper 154 of the auxiliary operating lever 132, as shown in FIG. 9. Accordingly, if the first or second operating lever 14 or 16 is pressed upward when the tape recorder 6 is in the recording mode, then the upper end face of the first or second operating lever 14 or 16 will abut on the lower end face of the second hanging portion 140 or the stopper 154 of the auxiliary operating lever 132. It is therefore impossible to locate the first or second operating lever 14 or 16 in its second position. Thus, the fast-forward or fast rewinding mode cannot be established while the tape recorder 6 is in the recording mode.

The fourth and fifth operating levers 20 and 22 in their respective second positions are returned to their respective first positions by the urging forces of the urging means 40, respectively, by locating the third operating lever 18 to its second position to bring the auxiliary operating lever 132 to its third position, thereby disengaging the fourth engaged projection 164 of the second rotating lever 162 and the fifth engaged portion 178 of the auxiliary operating lever 132 from the fourth engaging portion 60 of the fourth operating lever 20 and the fifth engaging portion 66 of the fifth operating lever 22, respectively.

Figure 10:
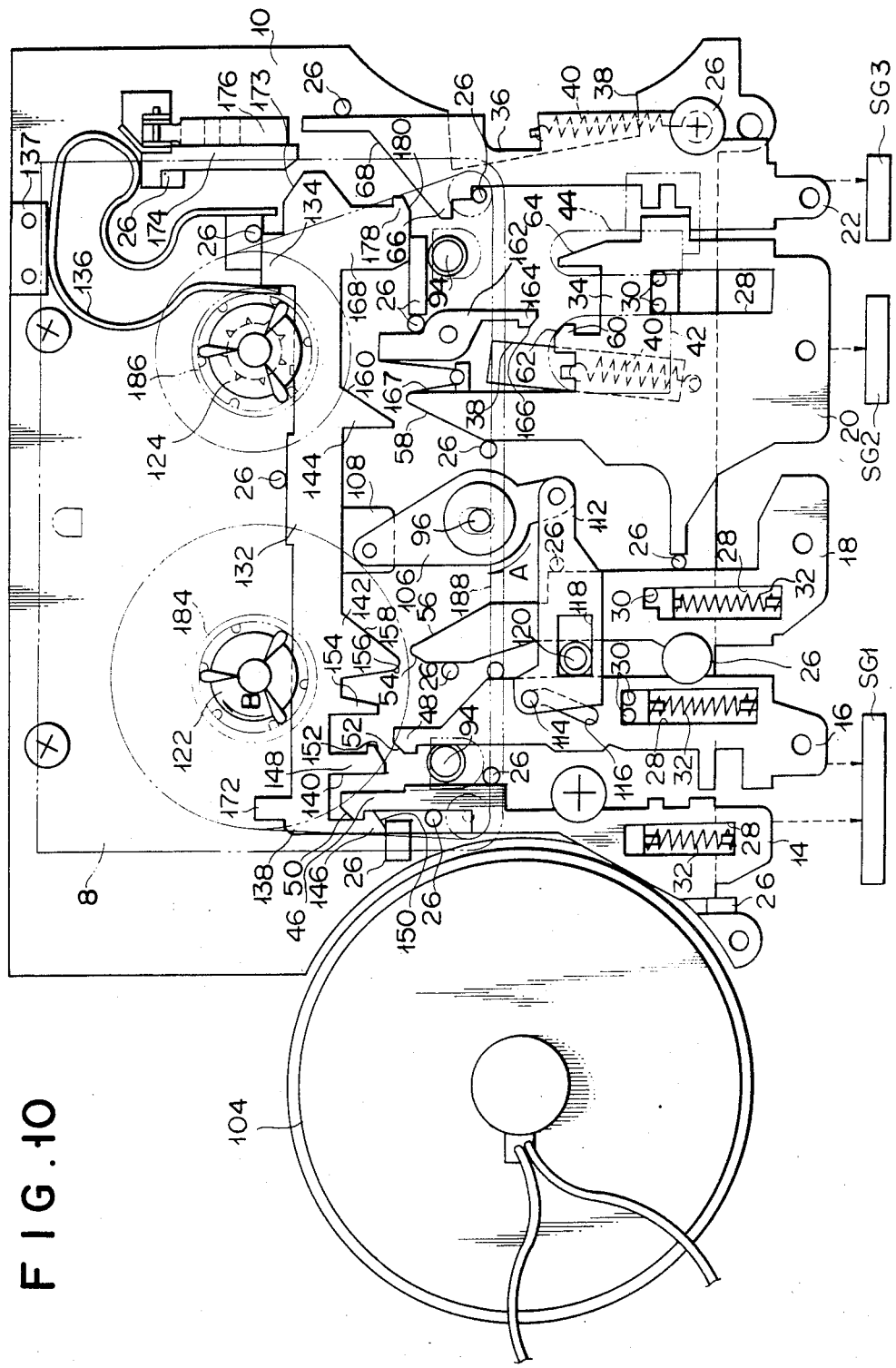
FIG. 10 is a plan view showing the pair of reel hubs of the tape cassette which are fitted on the pair of reel shafts of the tape recorder in FIG. 2, wherein the first operating lever which corresponds to the first operating lever as defined in the claims and which functions as a fast-forward lever is located in the second position thereof.

If the first operating lever 14 is pressed upward against the urging force of the urging means 32 when the first to fifth operating levers 14, 16, 18, 20 and 22 are in their respective first positions, as shown in FIG. 2, then the first slant face 50 of the first operating lever 14 comes into slide contact with the first auxiliary slant face 150 of the first hanging portion 132 of the auxiliary operating lever 132 to cause the auxiliary operating lever 132 to move from its first position to the left against the urging force of the urging means 136. Before the auxiliary operating lever 132 reaches its third position, the first engaging portion 46 of the first operating lever 14 engages the first engaged portion 146 of the first hanging portion 138 of the auxiliary operating lever 132, as shown in FIG. 10. Thereupon, the first operating lever 14 stops its upward movement. The position of the first operating lever 14 in this state corresponds to its second position. Thus, the fast-forward mode is established in the tape recorder 6. The position of the auxiliary operating lever 132 is defined as its fifth position. The second auxiliary slant face 152 of the auxiliary operating lever 132 in the fifth position vertically faces the second slant face 52 of the second operating lever 16.

Figure 11:
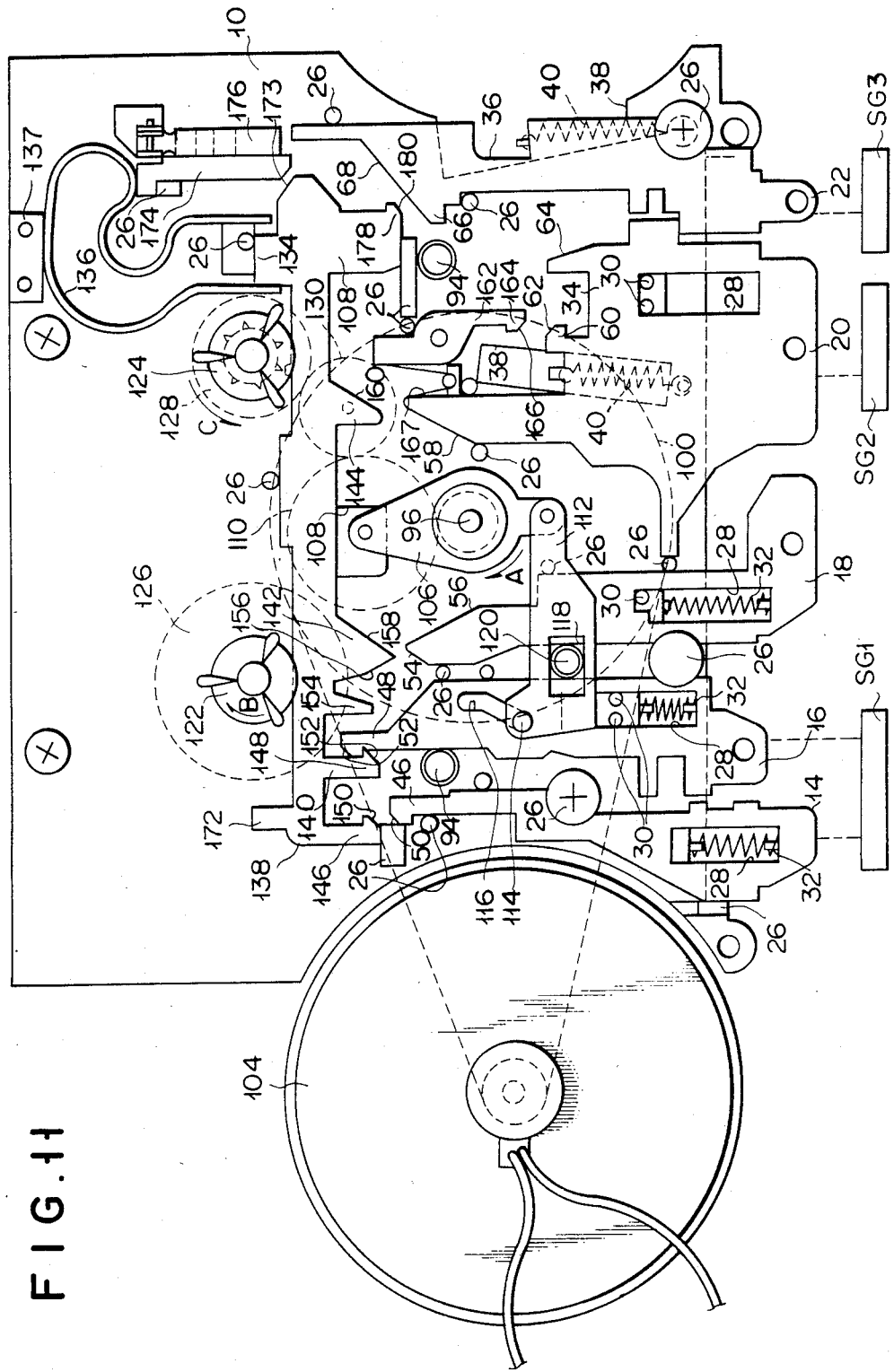
FIG. 11 is a plan view showing a state in which the second operating lever which corresponds to the first operating lever as defined in the claims and which functions as a rewind lever is located in the second position thereof.

If the second operating lever 16 is pressed upward against the urging force of the urging means 32 when the first operating lever 14 is in its second position, the second slant face 52 of the second operating lever 16 comes into slide contact with the second auxiliary slant face 152 of the second hanging portion 140 of the auxiliary operating lever 132 in its fifth position, thus causing the auxiliary operating lever 132 to move from its fifth position to the left against the urging force of the urging means 136. When the left-hand side face of the second engaging portion 48 of the second operating lever 16 comes into contact with the right-hand side face of the second engaged portion 148 of the second hanging portion 140 of the auxiliary operating lever 132, the first engaging portion 46 of the first operating lever 14 is disengaged from the first engaged portion 146 of the first hanging portion 138 of the auxiliary operating lever 132, and the first operating lever 14 is returned to its first position by the urging force of the urging means 32. Thereafter, if the second operating lever 16 is further moved upward, the second engaging portion 48 of the second operating lever 16 engages the second engaged portion 148 of the second hanging portion 140 of the auxiliary operating lever 132, as shown in FIG. 11. Thereupon, the second operating lever 16 stops its upward movement. The position of the second operating lever 16 in this state is defined as its second position. The position of the auxiliary operating lever 132 in this state corresponds to its fifth position. The first auxiliary slant face 150 of the first hanging portion 138 of the auxiliary operating lever 132 in the fifth position vertically faces the first slant face 50 of the first operating lever 14 in its first position.

As the second operating lever 16 moves from its first position to the second, the coupling member 112, which has its guide pin 114 guided by the guide hole 116 of the second operating lever 16, moves from the position shown in FIG. 2 to the left. As the coupling member 112 moves to the left, the first rotating lever 106 rotates clockwise from its first position shown in FIG. 2. Thus rotated, the first rotating lever 106 keeps the second gear 110 apart from the third gear 126 of the first reel shaft 122. When the coupling member 112 stops its leftward movement, that is, when the second operating lever 16 is located in its second position, the second gear 110 of the first rotating lever 106 comes to be in mesh with the fifth gear 130, as shown in FIG. 11. The position of the first rotating lever 106 in this state is defined as its second position.

When the second operating lever 16 is located in its second position, the first signal generator SG1 generates the first electric signal and the output shaft of the motor 104 rotates in one direction at relatively high speed, causing the capstan 96 and the first gear 98 to rotate in the direction indicated by arrow A in FIG. 11 at relatively high speed. When the second operating lever 16 is moved upward from its first position against the urging force of the urging means 32, the pinch roller is removed from the magnetic recording tape 188 in the tape cassette 8. Thus, the tape 188 is released from the joint hold by the pinch roller and the capstan 96. In FIG. 11, the magnetic recording tape 188 of the tape cassette 8 and the second base plate 12 are omitted so as to understand the movement of the first to fifth gears 98, 110, 126, 128 and 130 more easily. The relatively fast rotation of the first gear 98 in the direction indicated by arrow A is transmitted through the second gear 110 to the fifth gear 130. Then, the fourth gear 128 rotates in the direction indicated by arrow C in FIG. 11 at relatively high speed, so that the magnetic recording tape 188 in the tape cassette 8 is quickly rewound from the first reel hub 184 fitted on the first reel shaft 122 to the second reel hub 186 fitted on the second reel shaft 124. Thus, a fast rewinding mode is established in the tape recorder 6 which is provided with the operating lever device 4 according to this invention. This means that the second operating lever 16 serves as a fast rewinding lever in the tape recorder 6.

If the auxiliary operating lever 132 is shifted from its fifth position shown in FIG. 11 to its third position by locating the third operating lever 18 in its second position, the second engaging portion 48 of the second operating lever 16 is disengaged from the second engaged portion 148 of the second hanging portion 140 of the auxiliary operating lever 132, and the second operating lever 16 is returned to its first position by the urging force of the urging means 32. Thereupon, the coupling member 112, having its guide pin 114 guided by the guide hole 116 of the second operating lever 16, moves to the right to locate the first rotating lever 106 in its first position, as shown in FIG. 2.

Figure 12:
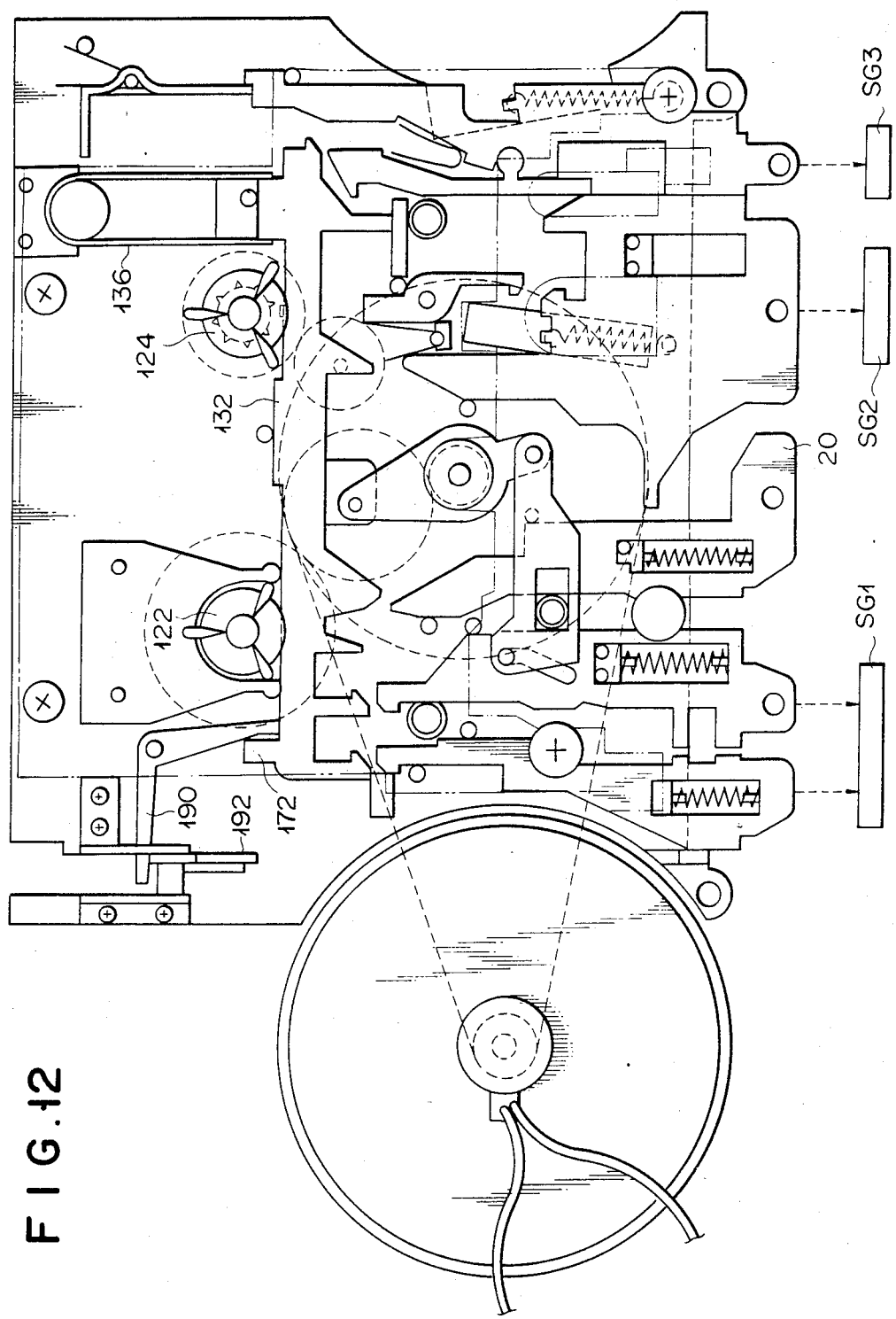
FIG. 12 is a plan view of a modification showing a state in which the plurality of operating levers are located in the first positions, respectively.

A modification of the operating lever device 4 will be described with reference to FIGS. 12 and 13. A third inverted L-shaped rotating member 190 is disposed beyond the second hook member 172 and between the first and second base plates 10 and 12. The substantially central part of the third rotating member 190 is pivoted to the front surface of the first base plate 10. The third rotating member 190 is free to rotate along the front surface of the first base plate 10. The left-hand side face of the lower end of the third rotating member 190 abuts against the right-hand side face of the second hook member 172 of the auxiliary operating lever 132. The lower end surface of the projection of the third rotating member 190 which extends to the left is brought into contact with a portion of an eject lever 192. This portion is separated from the center of rotation of the eject lever 192 disposed on the first base plate 10.

Figure 13:
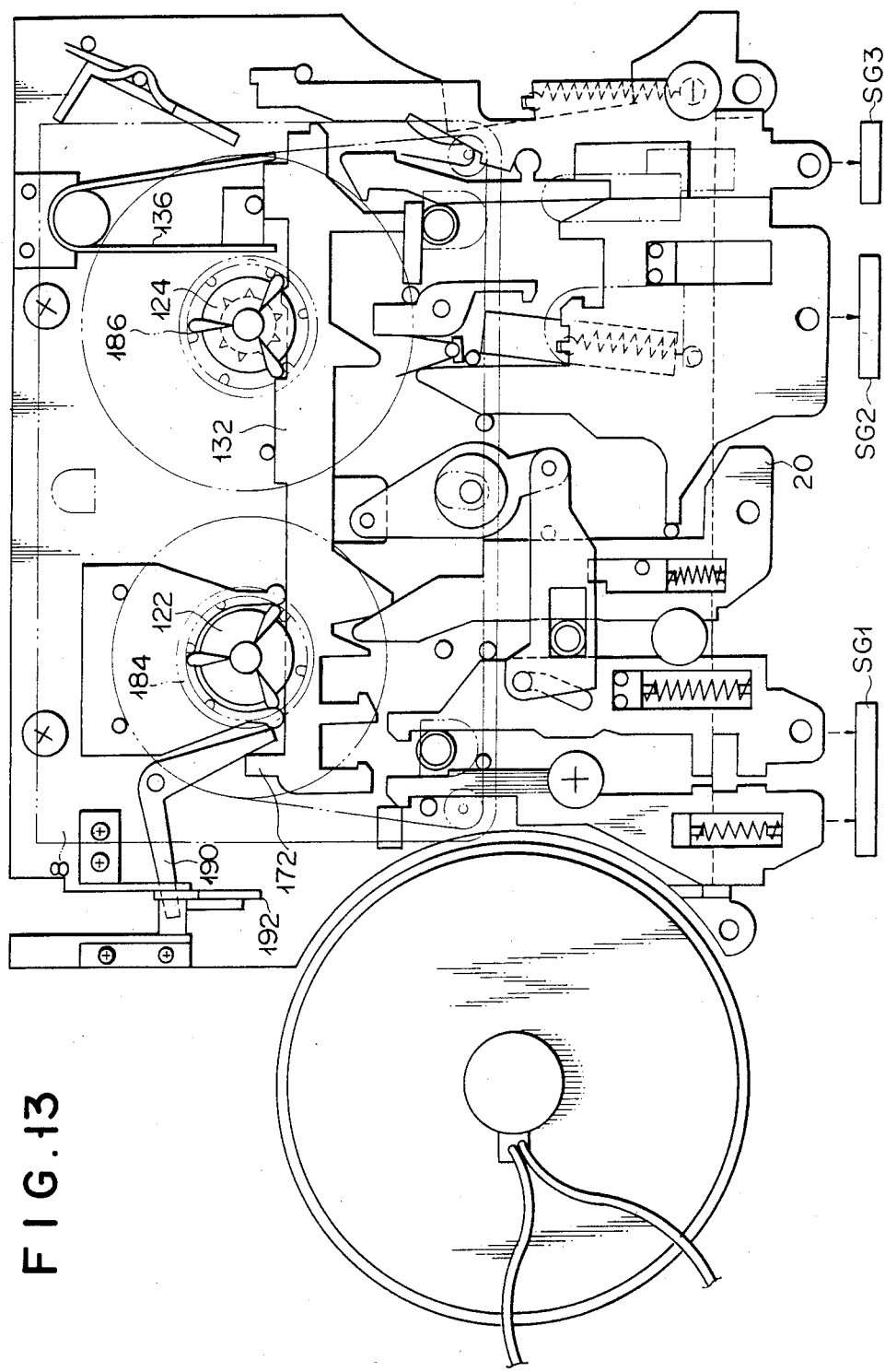
FIG. 13 is a plan view of the modification showing a state in which the third operating lever is located in the second position thereof so as to function as the eject lever.

With the above arrangement, if the third operating lever 18 is located in the second position, the auxiliary operating lever 132 is moved to the right of the first position against the urging force of the urging means 136, as shown in FIG. 13. The second hook member 172 causes the third rotating member 190 to rotate in the counterclockwise direction. The third rotating member 190 causes the eject lever 192 to intersect or become inclined relative to the first base plate 10. The eject lever 192 causes a member (not shown) which faces the bottom surface of the housing of the tape cassette 8 to move in the direction which intersects the first base plate 10, as shown in FIG. 12. Therefore, the first and second reel hubs 184 and 186 of the tape cassette 8 fitted on the first and second reel shafts 122 and 124, are released therefrom.

Although an illustrative embodiment of this invention has been described in detail herein, it is to be understood that the invention is not limited to such embodiment, and that various changes and modifications may be effected therein by one skilled in the art without departing from the scope or spirit of the invention.

What we claim is:

1. An operating lever device for a magnetic recording tape transport apparatus which uses a tape cassette, comprising:

a first base plate;

a second base plate parallel to said first base plate with a distance therebetween;

first operating lever means disposed between said first and second base plates to be movable along the first and second base plates between a first position and a second position;

second operating lever means disposed between said first and second base plates to be movable along the first and second base plates between first and second positions and parallel to the moving direction of said first operating lever means;

an auxiliary operating lever disposed between said first and second base plates to be movable along the first and second base plates among first, second, third and fourth positions and perpendicularly to a direction of movement of said first and second operating lever means, said auxiliary operating lever in the first position thereof being spaced apart from said first and second operating lever means located in the first positions thereof in the locus of movement of said first and second operating lever means from the first position to the second position thereof, said auxiliary operating lever in the second position thereof being engaged with said first operating lever means located at the second position thereof, said auxiliary operating lever in the third position thereof being released from said first operating lever means located in the second position thereof by being spaced apart from the first position farther than from the second position in a direction from the first position to the second position thereof upon movement of said first operating lever means to the second position thereof and subsequent movement of said second operating lever means to the second position thereof, said auxiliary operating lever in the fourth position thereof being separated from the first position thereof in a dction from the second and third positions to the first position thereof upon movement of said first operating lever means to the first position thereof and subsequent movement of said second operating lever means to the second position thereof; and ejecting means disposed at least at one of said first and second base plates for ejecting the tape cassette from the magnetic recording tape transport apparatus upon movement of said auxiliary operating lever from the first position to the fourth position thereof.

2. The operating lever device of claim 1, wherein said recording tape transport apparatus includes a signal generating means for generating an electrical signal, and means for setting a magnetic recording tape transport mode in response to said electrical signal from said signal generating means.

3. The operating lever device of claim 2, wherein said first operating lever causes said signal generating means to stop generating said electrical signal when said first operating lever is at its first position; and wherein said signal generating means is permitted to generate said electrical signal when said first operating lever is at said second position thereof.

4. The operating lever device of claim 1, wherein said ejecting means comprises a drive member disposed between said first and said second base plates and having a face in confronting relation with a face of said auxiliary operating lever wherein said drive member is moved when the face of said auxiliary operating lever abuts the face of said drive member as said auxiliary operating lever moves towards its fourth position, said drive member including a projection, and an eject lever mounted on a front surface of said first base plate for pivotal movement perpendicular to said front surface, said eject lever including a projection having a slant face arranged to engage the projection of said drive member when said drive member is moved by said auxiliary operating lever wherein said eject lever is pivoted to eject the tape cassette.

5. The operating lever device of claim 1, wherein one of said base plates includes projections arranged to contact the periphery of said auxiliary operating lever for guiding the movement of said auxiliary operating lever through its operating positions.

6. The operating lever device of claim 4, including a single urging means disposed between said first and said second base plates for urging said auxiliary operating lever toward its first position and for urging said drive member of said ejecting means to a position at which the projection on said drive member is out of engagement with the slant face on the projection of said eject lever.

7. The operating lever device of claim 6, wherein said urging means is a leaf spring in the shape of a bent U.

8. The operating lever device of claim 7, wherein the leg portions of said leaf spring engage left and right side faces of an upwardly projected part of said auxillary operating lever, and the upper end of said leaf spring engages said drive member.

9. The operating lever device of claim 1, wherein said auxiliary operating lever includes a hook member, and said ejecting means comprises a rotating member pivoted between said first and said second base plates wherein a face of said rotating member abuts a face of said hook member so that said rotating member pivots along said first base plate when said auxiliary operating lever moves towards its fourth position, and an eject lever disposed on said first base plate for pivotal movement perpendicular to said first base plate, a part to said eject lever engaging a confronting part of said rotating member when said rotating member is pivoted by said hook member wherein said eject lever operates to eject the tape cassette.

10. The operating lever device of claim 9, including urging means disposed between said first and said second base plates for urging said auxiliary operating lever toward its first position intermediate the path of movement of said auxiliary operating lever through its remaining operating positions including the position at which said hook member rotates said rotating member by an amount sufficient to operate said eject lever.

* * * * *

UNITED STATES PATENT AND TRADEMARK OFFICE
CERTIFICATE OF CORRECTION

PATENT NO. : 4,577,245

DATED : March 18, 1986

INVENTOR(S) : NEMOTO et al

It is certified that error appears in the above-identified patent and that said Letters Patent is hereby corrected as shown below:

COLUMN 9, line 15 should read --avoiding complication of the drawing.--;

COLUMN 16, line 8, "dction" should read --direction--.

Signed and Sealed this

Sixteenth Day of December, 1986

Attest:

DONALD J. QUIGG

Attesting Officer   Commissioner of Patents and Trademarks